United States Patent
Lee et al.

(10) Patent No.: US 8,761,438 B2
(45) Date of Patent: Jun. 24, 2014

(54) SYSTEMS AND METHODS FOR OBJECT IMAGING

(75) Inventors: Young Kyo Lee, San Diego, CA (US); Erik Edmund Magnuson, Cardiff, CA (US); Yuri Alexeyevich Plotnikov, Niskayuna, NY (US)

(73) Assignee: Morpho Detection, Inc., Newark, CA (US)

( * ) Notice: Subject to any disclaimer, the term of this patent is extended or adjusted under 35 U.S.C. 154(b) by 554 days.

(21) Appl. No.: 13/091,736

(22) Filed: Apr. 21, 2011

(65) Prior Publication Data

US 2012/0269385 A1 Oct. 25, 2012

(51) Int. Cl.
*G06K 9/00* (2006.01)
(52) U.S. Cl.
USPC ............. 382/103; 324/663; 378/4; 378/10; 378/18
(58) Field of Classification Search
USPC ......................................... 382/103
See application file for complete search history.

(56) References Cited

U.S. PATENT DOCUMENTS

| | | | |
|---|---|---|---|
| 6,577,700 B1 * | 6/2003 | Fan et al. | 378/4 |
| 7,119,553 B2 * | 10/2006 | Yang et al. | 324/663 |
| 7,295,019 B2 * | 11/2007 | Yang et al. | 324/663 |
| 7,317,819 B2 * | 1/2008 | Janes | 382/128 |
| 7,982,656 B2 * | 7/2011 | Coward et al. | 342/22 |
| 8,451,974 B2 * | 5/2013 | Morton | 378/57 |
| 8,550,998 B2 * | 10/2013 | Angelsen et al. | 600/437 |
| 8,625,735 B2 * | 1/2014 | Morton | 378/5 |
| 2006/0125475 A1 * | 6/2006 | Sodickson et al. | 324/300 |
| 2006/0176062 A1 * | 8/2006 | Yang et al. | 324/663 |
| 2007/0159185 A1 * | 7/2007 | Yang et al. | 324/663 |
| 2008/0303664 A1 * | 12/2008 | Huey et al. | 340/552 |
| 2009/0175562 A1 * | 7/2009 | Pan et al. | 382/312 |
| 2010/0111440 A1 * | 5/2010 | Chai et al. | 382/275 |
| 2012/0245873 A1 * | 9/2012 | Donnangelo et al. | 702/65 |
| 2012/0268272 A1 * | 10/2012 | Lee et al. | 340/540 |
| 2012/0269385 A1 * | 10/2012 | Lee et al. | 382/103 |

FOREIGN PATENT DOCUMENTS

WO 0012005 A1 3/2000
WO WO 2005036207 A2 * 4/2005

OTHER PUBLICATIONS

Bayford, "Bioimpedance Tomography (Electrical Impedance Tomography)"; Annu. Rev. Biomed. Eng. 2006. pp. 83-91; London, United Kingdom.

Frerichs, "Electrical impedance tomography (EIT) in applications related to lung and ventilation: a review of experimental and clinical activities"; Physiol. Meas. 21 (2000); 21 pages; United Kingdom.

(Continued)

*Primary Examiner* — Gandhi Thirugnanam
(74) *Attorney, Agent, or Firm* — Armstrong Teasdale LLP

(57) ABSTRACT

A method for imaging an object is provided. The method includes acquiring tomographic image data of the object at a plurality of frequencies, generating a composite image of the object at each of the plurality of frequencies using the acquired tomographic image data, determining a scaling factor for a first material at each of the plurality of frequencies, determining a scaling factor for a second material at each of the plurality of frequencies, and decomposing the composite images into a first discrete image and a second discrete image using the determined scaling factors, wherein the first discrete image contains any region of the object composed of the first material and the second discrete image contains any region of the object composed of the second material.

20 Claims, 9 Drawing Sheets

(56) References Cited

OTHER PUBLICATIONS

Romsauerova et al., "Evaluation of the performance of the Multifrequency Electrical Impedance Tomography (MFEIT) intended for imaging acute stroke"; ICEBI 2007, IFMBE Proceedings 17, pp. 543-547, 2007, Department of Medical Physics and Bioengineering, UCL, London, UK.

Osterman et al., "Multifrequency electrical impedance imaging: preliminary in vivo experience in breast", Physiol. Meas. 21 (2000) 99-109. Printed in the UK.

Oh et al., "Validation of a multi-frequency electrical impedance tomography (mfEIT) system KHU Mark1: impedance spectroscopy and time-difference imaging", 2008 Institute of Physics and Engineering in Medicine, Physiol. Meas. 29 (2008), pp. 295-307, London, UK.

Smith, "Toward Electric Field Tomography". Massachusetts Institute of Technology, 56 pages, 1995.

Korjenevsky et al., "Imaging of Conducting Media by the Electric Field Tomography Method", Kotel'nikov Institute of Radioengineering and Electronics, Russian Academy of Sciences, ul. Mokhovaya 11/7, Moscow, 125009 Russia, 7 pages, 2009.

Bolton et al., "A novel electrical tomography sensor for monitoring the phase distribution in industrial reactors," in: Proc. of the 7th UK Conf.—Fluid Mixing, Bradford, UK., 11 pages, 2002.

Korjenevsky et al., "Electric Field Tomography (EFT) illustrations"; available at http://www.cplire.ru/html/tomo/eftimage.html, 2 pages, 2007.

Korjenevsky et al., "Experimental demonstration of electric field tomography", Kotel'nikov Institute of Radioengineering and Electronics, pp. S127-S134, Russian Academy of Sciences, Mokhovaya 11-7, Moscow, 125009, Russia, 2010.

Barber, "Chapter 11—EIT: The View from Sheffield"; in D. Holder (Ed.), Electrical Impedance Tomography, Methods, History and Applications, pp. 348-372, Institute of Physics Publishing, Bristol and Philadelphia, 2004.

Search Report for GB1207052.0 dated Aug. 3, 2012; 1 page.

* cited by examiner

MUSCLE IMAGE COMPONENT, NO PLASTIC OBJECT

BONE IMAGE COMPONENT, NO PLASTIC OBJECT

PLASTIC IMAGE COMPONENT, NO PLASTIC OBJECT

MUSCLE IMAGE COMPONENT, WITH PLASTIC OBJECT

BONE IMAGE COMPONENT, WITH PLASTIC OBJECT

PLASTIC IMAGE COMPONENT, WITH PLASTIC OBJECT

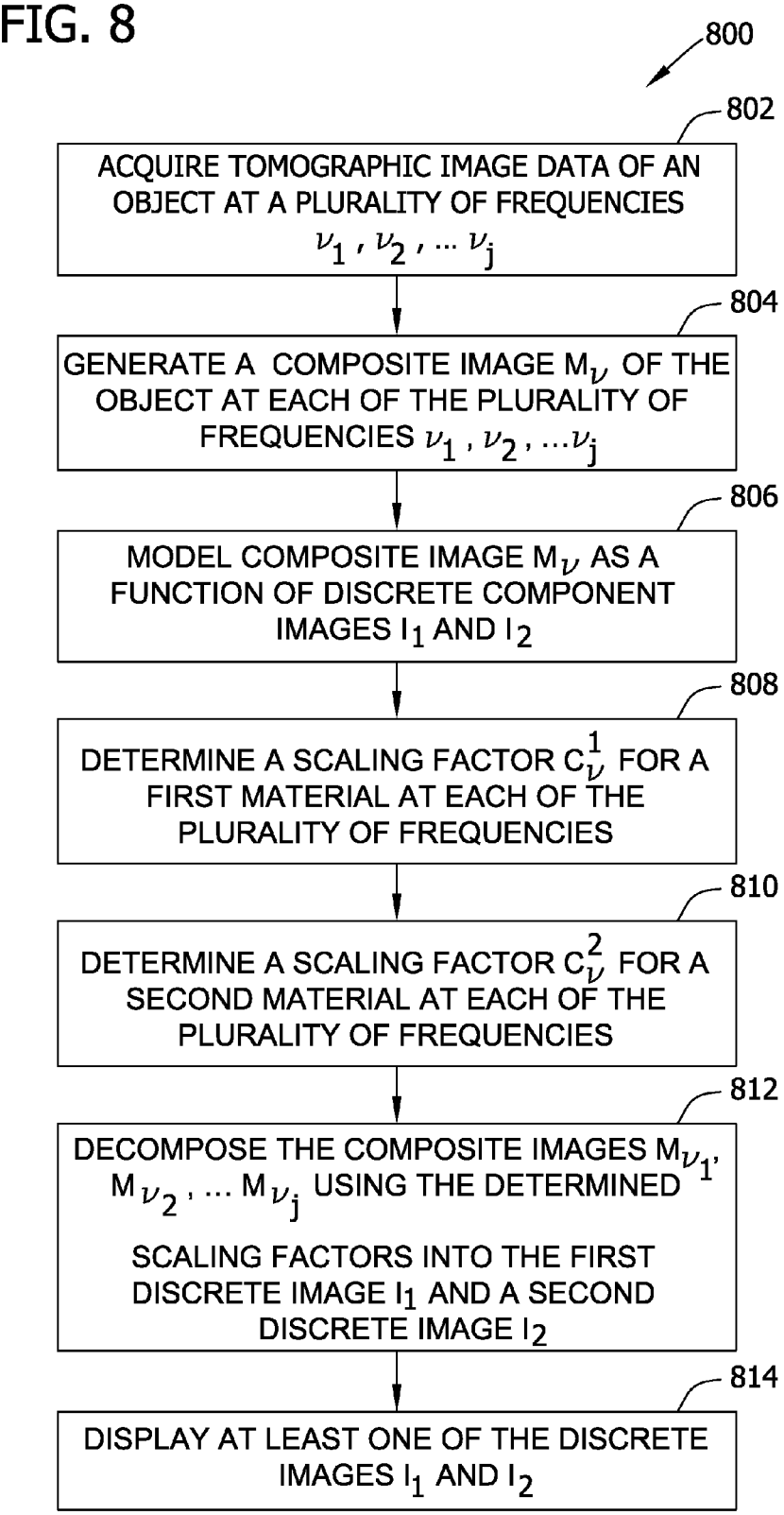

SYSTEMS AND METHODS FOR OBJECT IMAGING

STATEMENT REGARDING FEDERALLY SPONSORED RESEARCH OR DEVELOPMENT

This invention was made with United States government support under contract 2007-DE-BX-K001, awarded by the National Institute of Justice (NIJ). The United States government has certain rights in the invention.

BACKGROUND OF THE INVENTION

The embodiments described herein relate generally to tomographic imaging systems and, more particularly, to detecting objects using tomographic imaging systems.

In restricted areas such as airports and correctional facilities, detecting contraband in and/or on individuals is a high priority. Contraband such as drugs, keys, and plastic weapons may be hidden within body cavities of an individual, or on the individual (e.g., hidden under the individual's clothing). While some contraband may be detected by manually frisking passengers, privacy concerns make such methods problematic.

At least some known security scanners are capable of detecting metallic objects within body cavities and/or on an individual. However, at least some known security scanners are unable to detect non-metallic objects within body cavities and/or on an individual. While some medical imaging methods, such as X-ray computed tomography (CT) and magnetic resonance imaging (MRI), may be used to detect non-metallic objects, these imaging methods are typically quite expensive, and may involve exposing subjects to significant levels of radiation.

Low frequency electromagnetic tomography provides a safe and low cost method for imaging. Such imaging methods include electrical impedance tomography (EIT), magnetic induction tomography (MIT) and electric field tomography (EFT). However, low frequency electromagnetic tomography generally provides lower resolution and/or image quality when compared to X-ray CT and MRI. While multiple frequency electromagnetic tomography has been used to improve imaging quality, reduce artifacts, and detect abnormalities in tissue for diagnostic applications of mammography and hemorrhage detection, the low quality image resolution often limits the efficacy of such methods for detecting contraband.

BRIEF SUMMARY OF THE INVENTION

In one aspect, a method for imaging an object is provided. The method includes acquiring tomographic image data of the object at a plurality of frequencies, generating a composite image of the object at each of the plurality of frequencies using the acquired tomographic image data, determining a scaling factor for a first material at each of the plurality of frequencies, determining a scaling factor for a second material at each of the plurality of frequencies, and decomposing the composite images into a first discrete image and a second discrete image using the determined scaling factors, wherein the first discrete image contains any region of the object composed of the first material and the second discrete image contains any region of the object composed of the second material.

In another aspect, one or more computer-readable storage media having computer-executable instructions embodied thereon for imaging an object are provided. When executed by at least one processor, the computer-executable instructions cause the at least one processor to instruct a detector array to acquire tomographic image data of the object at a plurality of frequencies, generate a composite image of the object at each of the plurality of frequencies using the acquired tomographic image data, determine a scaling factor for a first material at each of the plurality of frequencies, determine a scaling factor for a second material at each of the plurality of frequencies, and decompose the composite images into a first discrete image and a second discrete image using the determined scaling factors, wherein the first discrete image contains any region of the object composed of the first material and the second discrete image contains any region of the object composed of the second material.

In yet another aspect, an imaging system for imaging an object is provided. The system includes a detector array configured to acquire tomographic image data of the object at a plurality of frequencies, and a processing device coupled to the detector array. The processor is configured to instruct the detector array to acquire tomographic image data of the object at a plurality of frequencies, generate a composite image of the object at each of the plurality of frequencies using the acquired tomographic image data, determine a scaling factor for a first material at each of the plurality of frequencies, determine a scaling factor for a second material at each of the plurality of frequencies, and decompose the composite images into a first discrete image and a second discrete image using the determined scaling factors, wherein the first discrete image contains any region of the object composed of the first material and the second discrete image contains any region of the object composed of the second material.

BRIEF DESCRIPTION OF THE DRAWINGS

FIG. 8 is a flowchart of an exemplary method that may be used with imaging system shown in FIG. 2.

DETAILED DESCRIPTION OF THE INVENTION

The embodiments described herein include an imaging system that can be used to detect contraband located in or near an individual's body. For example, embodiments of the imaging system can detect contraband concealed in an individual's abdominal, pelvic and/or groin area, such as between the passenger's legs or inside a body cavity. As used herein, the term "contraband" refers to illegal substances, explosives, narcotics, weapons, a threat object, and/or any other material that a person is not allowed to possess in a restricted area, such as an airport or a correctional facility.

In a particular embodiment, the imaging system acquires tomographic image data of an object at a plurality of frequencies and generates a composite image of the object at each of the frequencies. The imaging system further determines a scaling factor for a first material at each of the frequencies and a scaling factor for a second material at the frequencies. The imaging system decomposes the composite images into a first discrete image and a second discrete image using the scaling factors. From the discrete images, it can be determined whether contraband is located in or near the object.

Figure 1:
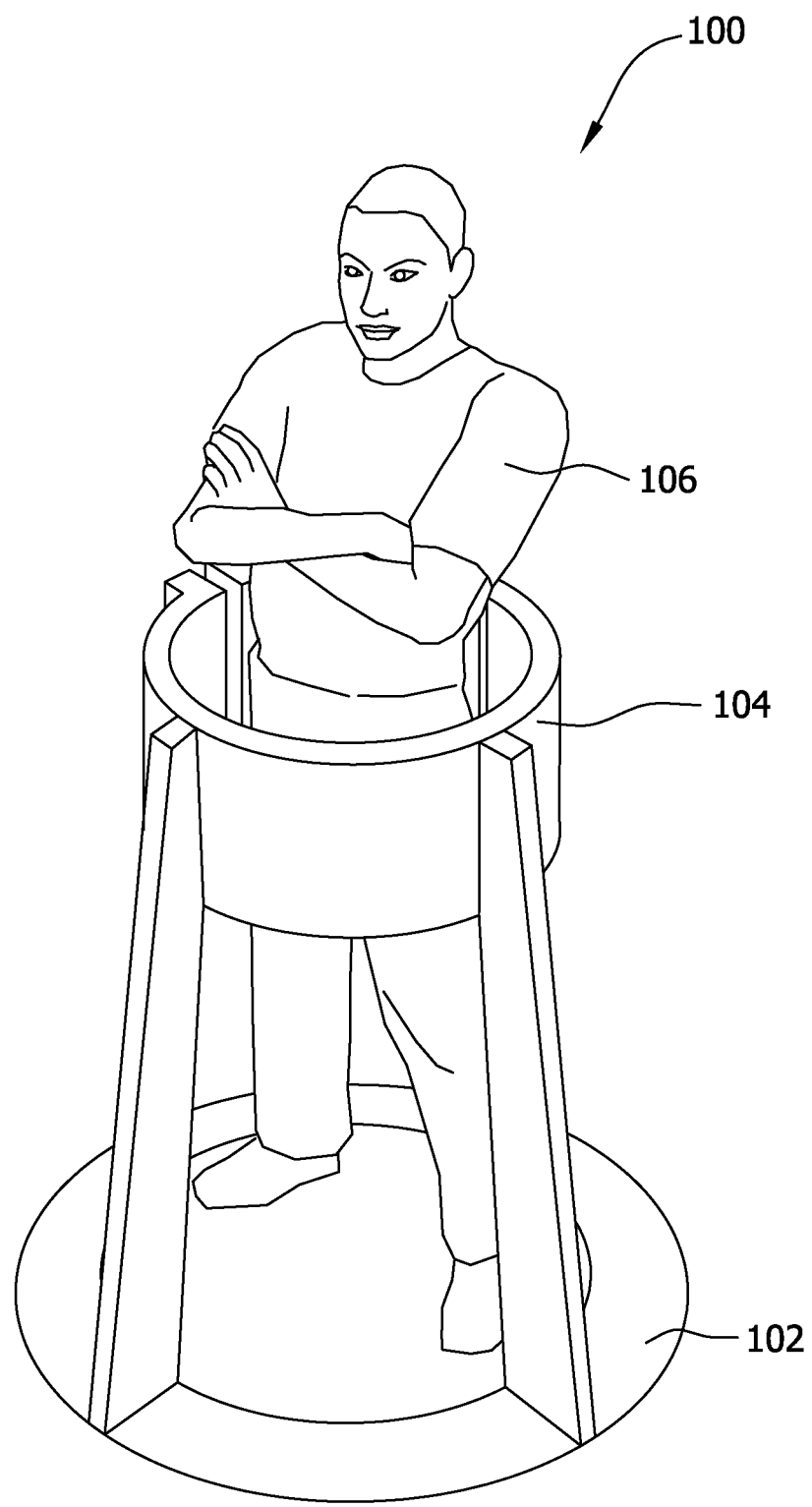
FIG. 1 is a perspective view of an exemplary security scanner.

Although an electric field tomography (EFT) system is described herein, it should be understood that the embodiments described herein can be used with any suitable imaging system, such as a magnetic induction tomography (MIT) system and/or an electrical impedance tomography (EIT) system. Further, although the methods and systems described herein are demonstrated using images reconstructed from finite element modeling (FEM) simulation data, experimental data would yield substantially similar results. FIG. 1 is a perspective view of an exemplary security scanner 100. Security scanner 100 includes a platform 102 and an imaging system 104. An object 106 to be scanned is positioned within imaging system 104. In the exemplary embodiment, object 106 is a human subject. Alternatively, object 106 may be any article and/or entity which are to be scanned for contraband. Security scanner 100 scans object 106 to detect contraband, as described in detail below.

Figure 2:
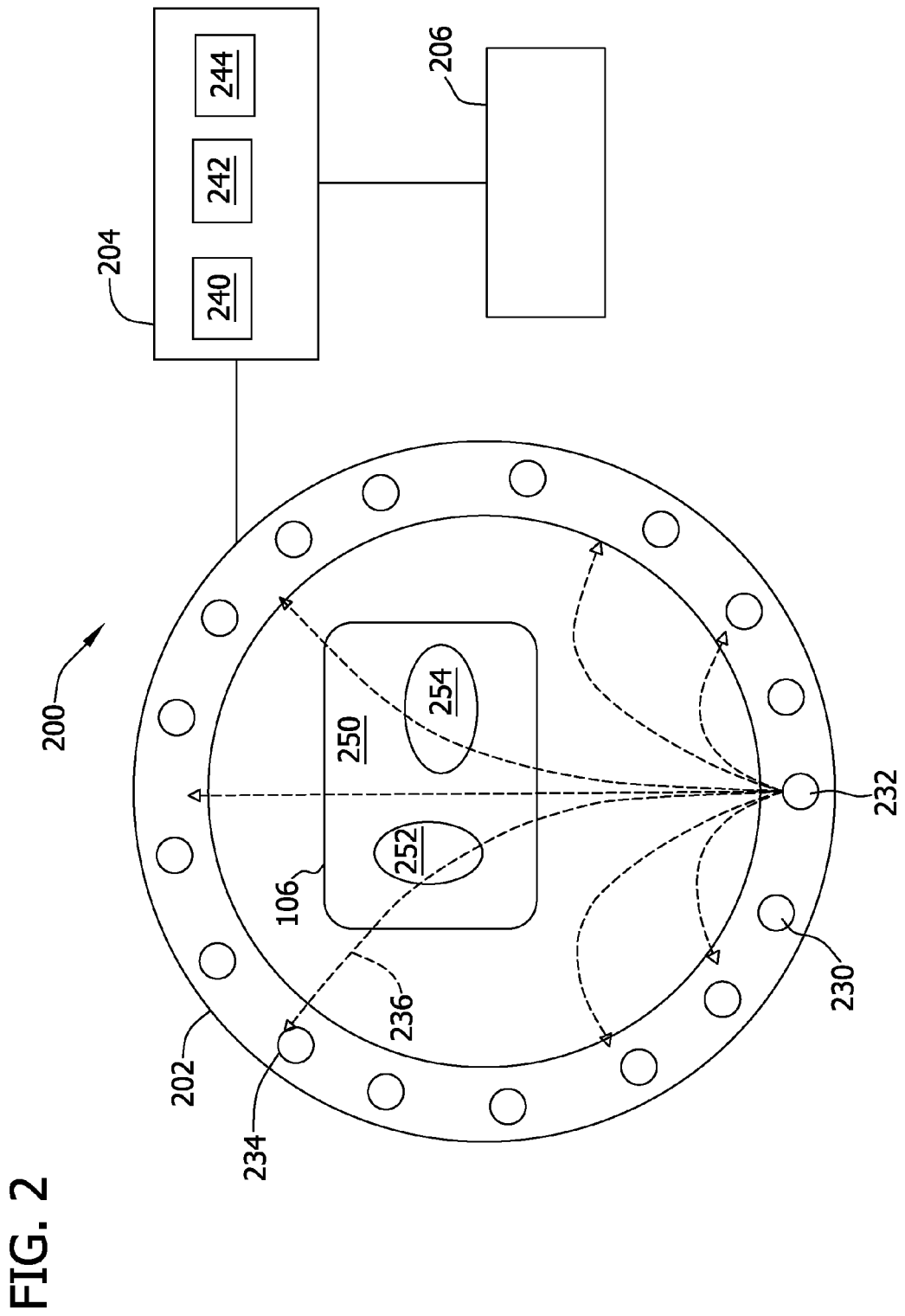
FIG. 2 is a schematic diagram of an imaging system that may be used with the security scanner shown in FIG. 1.

FIG. 2 is a schematic diagram of an imaging system 200 that may be used with security scanner 100 (shown in FIG. 1). In the exemplary embodiment, imaging system 200 is an EFT system. Alternatively, imaging system 200 may be any imaging system that enables security scanner 100 to function as described herein. For example, imaging system 200 may include an MIT and/or EIT system.

In the exemplary embodiment, imaging system 200 includes a detector array 202, a processing device 204, and a display device 206. Processing device 204 is coupled to detector array 202 and acquires and processes image data utilizing detector array 202, as described in detail below. Display device 206 is coupled to processing device 204 and displays processed image data. Display device 206, may include, for example, a cathode ray tube (CRT), a liquid crystal display (LCD), an organic light emitting diode (OLED) display, and/or an "electronic ink" display.

In the exemplary embodiment, detector array 202 forms a closed ring. Alternatively, detector array 202 may have any shape that enables detector array 202 to function as described herein. Detector array 202 includes a plurality of electrodes 230. In the exemplary embodiment, detector array 202 includes seventeen electrodes 230. Alternatively, detector array 202 may include any number of electrodes 230 that enables detector array 202 to function as described herein. Detector array 202 acquires image data of object 106, as described in detail below.

Each of electrodes 230 is capable of functioning as both an emitting electrode 232 and a detecting electrode 234. During operation of detection array 202, one electrode 230 functions as emitting electrode 232, and the remaining electrodes 230 function as detecting electrodes 234. To acquire image data, emitting electrode 232 emits an electric field at a frequency, v. To generate the electric field, emitting electrode 232 may be coupled to, for example, an alternating voltage source (not shown). The electric field is emitted along a plurality of projection lines 236, and at least some of projection lines 236 pass through object 106. For clarity, a limited number of projection lines 236 are illustrated in FIG. 2. However, those of ordinary skill in the art will understand that the electric field is emitted from emitting electrode 232 along an infinite number of projection lines 236.

As the electric field passes through object 106 along projection lines 236, the electric field undergoes a phase shift, $\Delta$. The magnitude of the phase shift $\Delta$ depends on the electrical properties of the material composing object 106, such as the conductivity and electrical permittivity. Detecting electrodes 234 measure the phase shift $\Delta$ of the electric field. To measure the phase shift $\Delta$, detecting electrodes 234 may be coupled to, for example, a phase sensitive voltmeter (not shown). Phase shift data including the detected phase shift $\Delta$ at each detecting electrode is transmitted to and stored at processing device 204. This process is repeated until each electrode 230 functions as emitting electrode 232.

After phase shift data has been transmitted to processing device 204 with each electrode functioning as emitting electrode 232, processing device 204 uses the phase shift data to reconstruct a composite image of object 106 at frequency v, $M_v$. In the exemplary embodiment, processing device 204 uses a filtered back-projection algorithm to reconstruct composite image $M_v$. Alternatively, processing device 204 may use any suitable image-reconstruction method to reconstruct composite image $M_v$.

Processing device 204 may be implemented to control, manage, operate, and/or monitor the various components associated with imaging system 200. In the exemplary embodiment, processing device 204 includes a graphical user interface 240, processor 242, and memory 244. Alternatively, processing device 204 may be implemented using any suitable computational device that provides the necessary control, monitoring, and data analysis of the various systems and components associated with imaging system 200.

In general, processing device 204 may be a specific or general purpose computer operating on any known and available operating system and operating on any device including, but not limited to, personal computers, laptops and/or handheld computers. Graphical user interface 240 may be any suitable display device operable with any of the computing devices described herein and may include a display, for example, a CRT, a LCD, an OLED display, and/or an "electronic ink" display. In one embodiment, display device 206 serves as the display for graphical user interface 240.

A communication link between processing device 204 and detector array 202 may be implemented using any suitable technique that supports the transfer of data and necessary signaling for operational control of the various components of detector array 202. The communication link may be implemented using conventional communication technologies such as micro transport protocol, Ethernet, wireless, coaxial cables, serial or parallel cables, and/or optical fibers, among others. In some embodiments, processing device 204 is physically configured in close physical proximity to detector array 202. Alternatively, processing device 204 may be remotely implemented if desired. Remote implementations may be accomplished by configuring processing device 204 and detector array 202 with a suitably secure network link that includes a dedicated connection, a local area network (LAN), a wide area network (WAN), a metropolitan area network (MAN), and/or the Internet, for example.

The various methods and processes described herein may be implemented in a computer-readable medium using, for example, computer software, hardware, or some combination thereof. For a hardware implementation, the embodiments described herein may be performed by processor 242, which may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. For a software implementation, the embodiments described herein may be implemented with separate software modules, such as procedures, functions, and the like, each of which perform one or more of the functions and operations described herein. The software codes can be implemented with a software application written in any suitable programming language and may be stored in a memory unit, for example, memory 244, and executed by a processor, for example, processor 242. The memory unit may be implemented within the processor or external to the processor, in which case it can be communicatively coupled to the processor using known communication techniques. Memory 244 shown in FIG. 2 may be implemented using any type (or combination) of suitable volatile and nonvolatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar or effective memory or data storage device.

In the exemplary embodiment, object 106 is composed of a muscle component 250, a bone component 252, and a plastic component 254. Alternatively, object 106 may be composed of any material, for example, a crystalline material, a biological material, a non-metallic material, a metallic material, and/or a ceramic material. In an embodiment where object 106 is a human subject, muscle component 250 and bone component 252 typically correspond to anatomical structures of the human subject. However, the presence of plastic component 254 in a human subject may indicate the presence of a foreign object and/or contraband.

Notably, the electrical properties of tissue and/or tissue-like materials, such as muscle and bone, are significantly different from the electrical properties of non-tissue materials, such as plastic. Given this difference in electrical properties, using the methods and systems described herein, components of an object composed of a tissue-like material can be differentiated from components of an object composed of a non-tissue material. Accordingly, while in the exemplary embodiment, imaging system 200 detects plastic component 254 by differentiating plastic component 254 from muscle component 250 and bone component 252, as described in detail below, imaging system 200 may be used differentiate a wide range of non-tissue materials from tissue-like materials.

When object 106 is composed of several different materials, for example muscle component 250, bone component 252, and plastic component 254, composite image $M_v$ contains image data for all of the different materials. However, when using an imaging system utilizing a relatively low resolution imaging technique, such as EFT, individual materials may not be distinguishable from one another in the composite image $M_v$.

Figure 3A:
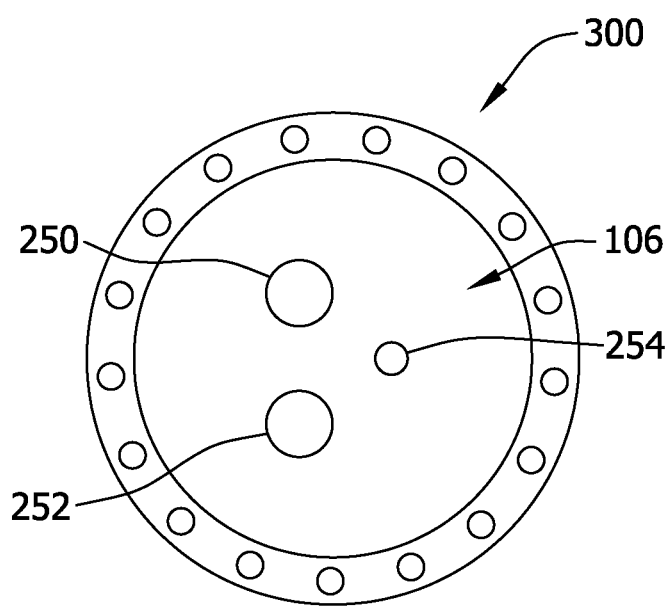
FIG. 3(a) is a schematic diagram of a detector array.
Figure 3B:
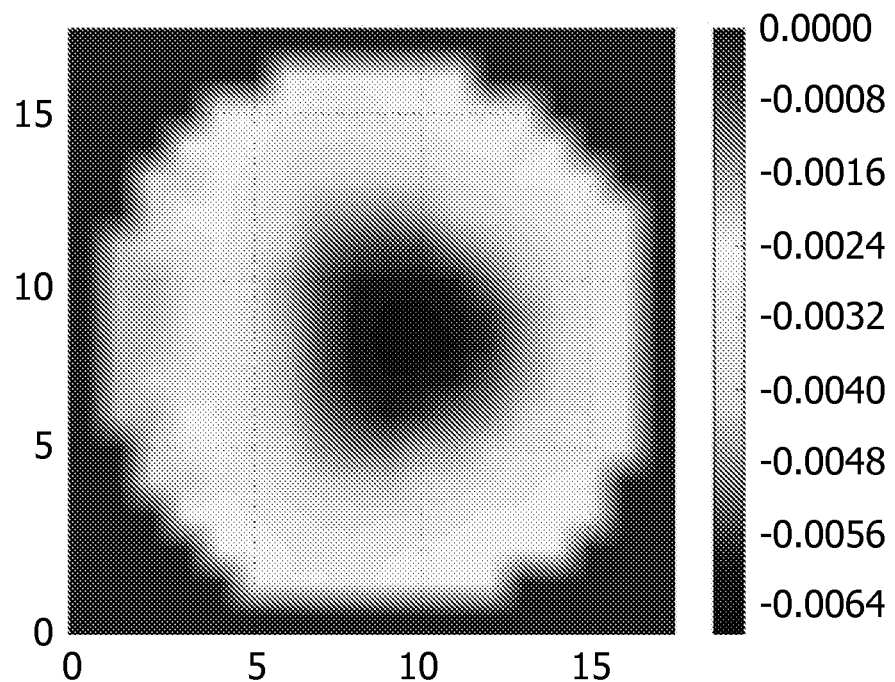
FIG. 3(b) is a composite image of the detector array shown in FIG. 3(a).

For example, FIG. 3(a) is a schematic diagram of a detector array 300. FIG. 3(b) is a composite image $M_{5\ MHz}$, constructed from finite element modeling (FEM) data, of muscle component 250, bone component 252, and plastic component 254 in detector array 300 at an electric field frequency of 5 Megahertz (MHz). The components 250, 252 and 254 have relative locations and dimensions in object 106 as shown in FIG. 3(a). As demonstrated by FIG. 3(b), muscle component 250, bone component 252, and plastic component 254 are not distinguishable from one another in composite image $M_{5\ MHz}$. Accordingly, when generating a composite image $M_v$ at only a single frequency $v$, given the relatively low resolution of imaging system 200, it cannot easily be determined whether object 106 includes plastic component 254, and accordingly, whether contraband is present on and/or within object 106.

To determine whether object 106 includes plastic component 254, image data is acquired at a plurality of frequencies. More specifically, image data is acquired at j different frequencies $v_1, v_2, \ldots v_j$. From the acquired image data, corresponding composite images $M_{v_1}, M_{v_2}, \ldots M_{v_j}$ are generated using processing device 204. In the exemplary embodiment, frequencies $v_1, v_2, \ldots v_j$ are within a range of 1 megahertz (MHz) to 20 MHz. Alternatively, frequencies $v_1, v_2, \ldots v_j$ may span any range of frequencies that enables imaging system 200 to function as described herein.

In the exemplary embodiment, composite images $M_{v_1}, M_{v_2}, \ldots M_{v_j}$ are decomposed into a discrete plastic image $I_P$, a discrete muscle image $I_M$, and a discrete bone image $I_B$. Discrete plastic image $I_P$ contains any regions of object 106 composed of plastic component 254, discrete muscle image $I_M$ contains any regions of object 106 composed of muscle component 250, and discrete bone image $I_B$ contains any regions of object 106 composed of bone component 252. Alternatively, composite images $M_{v_1}, M_{v_2}, \ldots M_{v_j}$ may be decomposed into any number of discrete images corresponding to an identical number of components.

Using a linear least square approximation, a composite image $M_v$ at a given frequency $v$ can be modeled using Equation (1):

$$\alpha I_P + \beta I_M + \gamma I_B = M_v \qquad (1)$$

where $\alpha$, $\beta$, and $\gamma$ are constants. While in the exemplary embodiment, a linear least square approximation is used, any approximation method that enables imaging system 200 to function as described herein may be used. Further, while in the exemplary embodiment, composite image $M_v$ is modeled as having three components, $I_P$, $I_M$, and $I_B$, composite image $M_v$ may be modeled as being composed of any number of components that enables system 200 to function as described herein.

Across a plurality of frequencies $v_1, v_2, \ldots v_j$, the detected phase shifts $\Delta$ for muscle component 250 and bone component 252 generally have much greater variation than the detected phase shift $\Delta$ of plastic component 254, due to the conductive properties of muscle and bone, as compared to the conductive properties of plastic. More specifically, the difference between a detected phase shift of muscle component 250 at a first frequency and a detected phase shift of muscle component 250 at a second frequency, $|\Delta_{v_1}^M - \Delta_{v_2}^M|$, and the difference between a detected phase shift of bone component 252 at the first frequency and a detected phase shift of bone component 252 at the second frequency, $|\Delta_{v_1}^B - \Delta_{v_2}^B|$, are both appreciably greater than the difference between a detected phase shift of plastic component 254 at the first frequency and a detected phase shift of plastic component 254 at the second frequency, $|\Delta_{v_1}^P - \Delta_{v_2}^P|$.

Accordingly, in Equation (1), $\alpha$ is set equal to a plastic image scaling factor $C_v^P$, $\beta$ is set equal to a muscle image scaling factor $C_v^M$, and $\gamma$ is set equal to a bone image scaling factor $C_v^B$. Thus, at frequencies $v_1, v_2, \ldots v_j$, composite images $M_{v_1}, M_{v_2}, \ldots M_{v_j}$ can be represented as Equation (2):

$$\begin{bmatrix} C_{v_1}^P & C_{v_1}^M & C_{v_1}^B \\ C_{v_2}^P & C_{v_2}^M & C_{v_2}^B \\ \vdots & \vdots & \vdots \\ C_{v_j}^P & C_{v_j}^M & C_{v_j}^B \end{bmatrix} \begin{bmatrix} I_P \\ I_M \\ I_B \end{bmatrix} = \begin{bmatrix} M_{v_1} \\ M_{v_2} \\ \vdots \\ M_{v_j} \end{bmatrix} \quad (2)$$

This matrix equation can also be written as Equation (3):

$$Ax = b \quad (3)$$

where $$A = \begin{bmatrix} C_{v_1}^P & C_{v_1}^M & C_{v_1}^B \\ C_{v_2}^P & C_{v_2}^M & C_{v_2}^B \\ \vdots & \vdots & \vdots \\ C_{v_j}^P & C_{v_j}^M & C_{v_j}^B \end{bmatrix} \quad (4)$$

$$x = \begin{bmatrix} I_P \\ I_M \\ I_B \end{bmatrix} \quad (5)$$

and $$b = \begin{bmatrix} M_{v_1} \\ M_{v_2} \\ \vdots \\ M_{v_j} \end{bmatrix} \quad (6)$$

Matrix x includes the discrete tissue images, into which the composite images $M_{v_1}, M_{v_2}, \ldots M_{v_j}$ are decomposed. In the exemplary embodiment, matrix x includes three discrete images, $I_P$, $I_M$, and $O_B$. Alternatively, matrix x can include any number of discrete images. In the exemplary embodiment, matrix A includes muscle image scaling factors $C_{v_1}^M$, $C_{v_2}^M, \ldots C_{v_j}^M$, bone image scaling factors $C_{v_1}^B, C_{v_2}^B, \ldots C_{v_j}^B$, and plastic scaling factors $C_{v_1}^P, C_{v_2}^P, \ldots C_{v_j}^P$. Image scaling factors $C_v^M$, $C_v^B$, and $C_v^P$ are determined as described in detail below.

While the above equations are for an embodiment where composite images $M_{v_1}, M_{v_2}, \ldots M_{v_j}$ are decomposed into discrete plastic image $I_P$, discrete muscle image $I_M$, and discrete bone image $I_B$, those of ordinary skill in the art will appreciate that the above equations can be modified to decompose composite images into $M_{v_1}, M_{v_2}, \ldots M_{v_j}$ into any suitable number of discrete images for any types of materials which enable imaging system 200 to function as described herein.

Figure 4A:
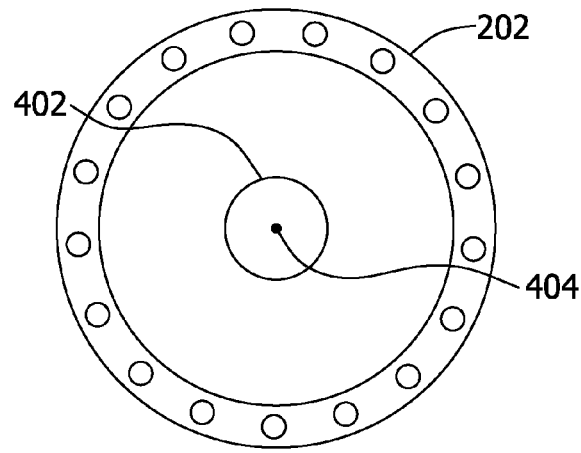
FIGS. 4(a)-4(c) are schematic diagrams of a detector array.
Figure 4B:
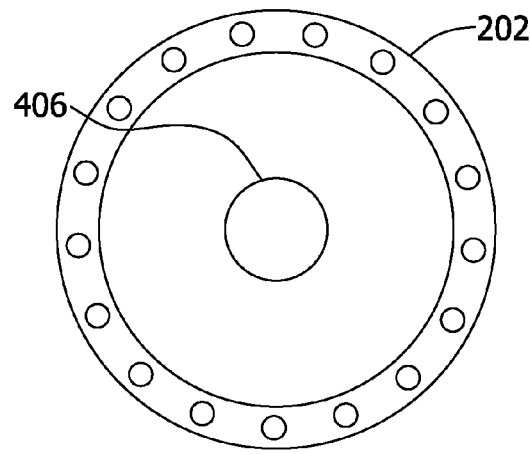
Figure 4C:
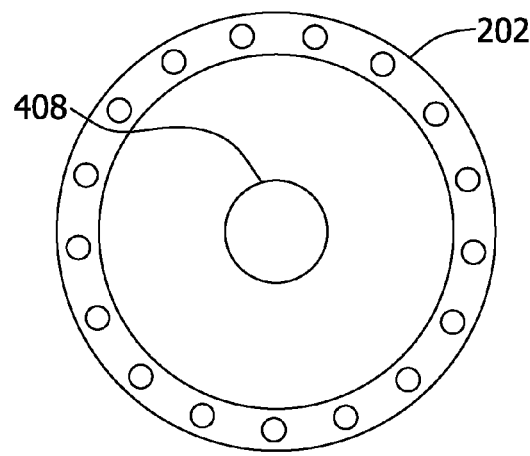
Figure 5A:
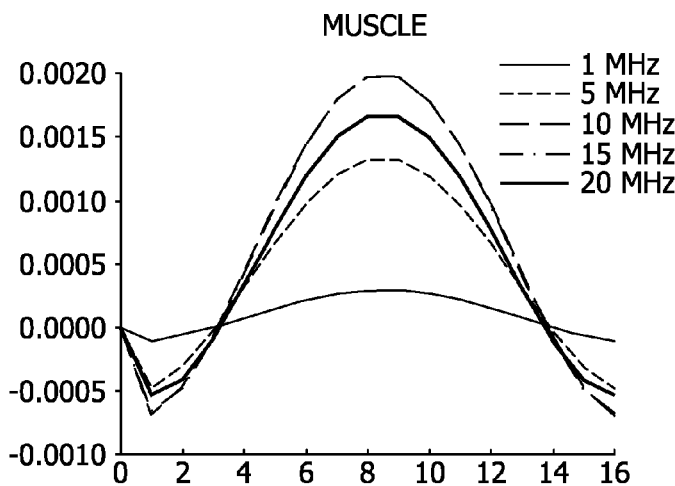
FIGS. 5(a)-5(c) are calibration graphs for the detector arrays shown in FIGS. 4(a)-4(c).
Figure 5B:
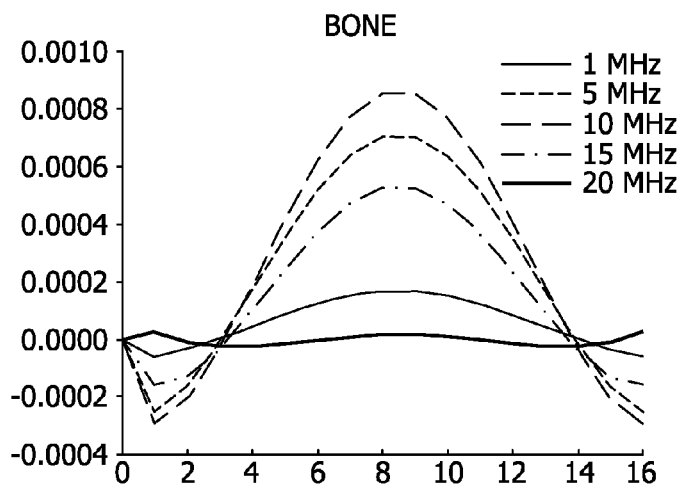
Figure 5C:
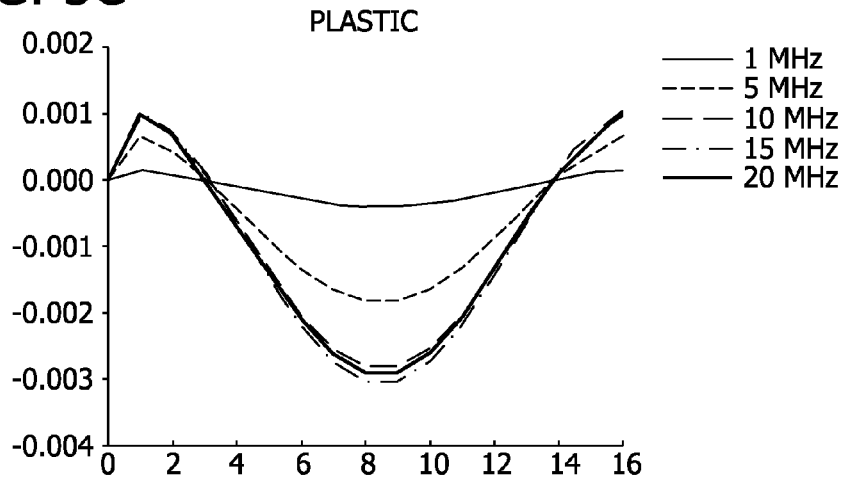

FIGS. 4(a)-4(c) are schematic diagrams of detector array 202. FIGS. 5(a)-5(c) are calibration graphs of detected phase shift Δ versus detecting electrode number for detector array 202 as shown in FIGS. 4(a)-4(c), respectively. The data shown in the calibration graphs of FIGS. 5(a)-5(c) includes FEM data generated by simulating detector array 202 of FIGS. 4(a)-4(c). However, acquiring experimental data for detector array 202, as described herein, would yield substantially similar results.

In the embodiment of FIG. 4(a), a muscle calibration object 402 is located at a center 404 of detector array 202. Muscle calibration object 402 is composed of muscle material, and does not include bone material or plastic material. Detector array 202 acquires image data of muscle calibration object 402, as described above. Because muscle calibration object 402 is located at center 404, image data need only be acquired using one electrode 230 as emitting electrode 232. More specifically, when muscle calibration object 402 is located at center 404 of detector array 202, image data acquired using any one electrode 230 as emitting electrode 232 should be identical to image data acquired using any other electrode 230 as emitting electrode 232.

To generate the calibration graph of FIG. 5(a), image data of muscle calibration object 402 is acquired for the plurality of electric field frequencies $v_1, v_2, \ldots v_j$. In the exemplary embodiment, image data of muscle calibration object 402 is acquired at 1, 5, 10, 15, and 20 MHz. Alternatively, image data of muscle calibration object 402 may be acquired at any frequencies that allow imaging system 200 to function as described herein. From the calibration graph, muscle image scaling factors $C_{v_1}^M, C_{v_2}^M, \ldots C_{v_j}^M$ can be determined. In the exemplary embodiment, the maximum value of each frequency curve is selected as the muscle image scaling factor. Alternatively, scaling factors $C_{v_1}^M, C_{v_2}^M, \ldots C_{v_j}^M$ may be determined using any method that enables imaging system 200 to function as described herein.

In the embodiment of FIG. 4(b), a bone calibration object 406 is located at center 404 of detector array 202. Bone calibration object 406 is composed of bone material, and does not include muscle material or plastic material. Detector array 202 acquires image data of bone calibration object 406, as described above. Because bone calibration object is located at center 404, image data need only be acquired using one electrode 230 as emitting electrode 232. More specifically, when bone calibration object 406 is located at center 404 of detector array 202, image data acquired using any one electrode 230 as emitting electrode 232 should be identical to image data acquired using any other electrode 230 as emitting electrode 232.

To generate the calibration graph of FIG. 5(b), image data of bone calibration object 406 is acquired for the plurality of electric field frequencies $v_1, v_2, \ldots v_j$. In the exemplary embodiment, image data of bone calibration object 406 is acquired at 1, 5, 10, 15, and 20 MHz. Alternatively, image data of bone calibration object 406 may be acquired at any frequencies that allow imaging system 200 to function as described herein. From the calibration graph, bone image scaling factors $C_{v_1}^B, C_{v_2}^B, \ldots C_{v_j}^B$ can be determined. In the exemplary embodiment, the maximum value of each frequency curve is selected as the bone image scaling factor. Alternatively, scaling factors $C_{v_1}^B, C_{v_2}^b, \ldots C_{v_j}^B$ may be determined using any method that enables imaging system 200 to function as described herein.

In the embodiment of FIG. 4(c), a plastic calibration object 408 is located at center 404 of detector array 202. Plastic calibration object 408 is composed of plastic material, and does not include muscle material or bone material. Detector array 202 acquires image data of plastic calibration object 408, as described above. Because plastic calibration object 408 is located at center 404, image data need only be acquired using one electrode 230 as emitting electrode 232. More specifically, when plastic calibration object 408 is located at center 404 of detector array 202, image data acquired using any one electrode 230 as emitting electrode 232 should be identical to image data acquired using any other electrode 230 as emitting electrode 232.

To generate the calibration graph of FIG. 5(c), image data of plastic calibration object 408 is acquired for the plurality of electric field frequencies $v_1, v_2, \ldots v_j$. In the exemplary embodiment, image data of plastic calibration object 408 is acquired at 1, 5, 10, 15, and 20 MHz. Alternatively, image data of plastic calibration object 408 may be acquired at any frequencies that allow imaging system 200 to function as described herein. From the calibration graph, plastic image scaling factors $C_{v_1}^P, C_{v_2}^P, \ldots C_{v_j}^P$ can be determined. In the exemplary embodiment, the minimum value of each frequency curve is selected as the plastic image scaling factor. Alternatively, scaling factors $C_{v_1}^P, C_{v_2}^P, \ldots C_{v_j}^P$ may be determined using any method that enables imaging system 200 to function as described herein.

Comparing FIG. 5(c) with FIGS. 5(a) and 5(b), it can be seen that the detected phase shifts Δ for plastic calibration object 408 generally have much less variation over the range of frequencies than the detected phase shift Δ of muscle calibration object 402 and bone calibration object 406. This is due to the difference between the electrical properties of plastic and the electrical properties of bone and muscle.

In the exemplary embodiment, the image scaling factors are determined by acquiring image data of calibration objects, such as, for example, muscle calibration object 402, bone calibration object 406, and plastic calibration object 408. Alternatively, any technique that enables imaging system 200 to function as described herein may be utilized to determine the image scaling factors, including, but not limited to, finite element modeling. Once image scaling factors, for example, image scaling factors $C_v^M$, $C_v^B$, and $C_v^P$, are determined, matrix x, and accordingly, discrete images, $I_P$, $I_M$, and $I_B$, are given by Equation (7):

$$x = (A^T A)^{-1} A^T b \qquad (7)$$

Thus, after decomposing the composite images $M_{v_1}$, $M_{v_2}, \ldots M_{v_j}$ into discrete images $I_P$, $I_M$, and $I_B$, each discrete image can be displayed separately, for example, on display device 206. In the exemplary embodiment, discrete image $I_P$ includes any regions of object 106 composed of plastic component 254. As such, from discrete image $I_P$, it can be determined whether or not a plastic component 254 is present in object 106.

Figure 6A:
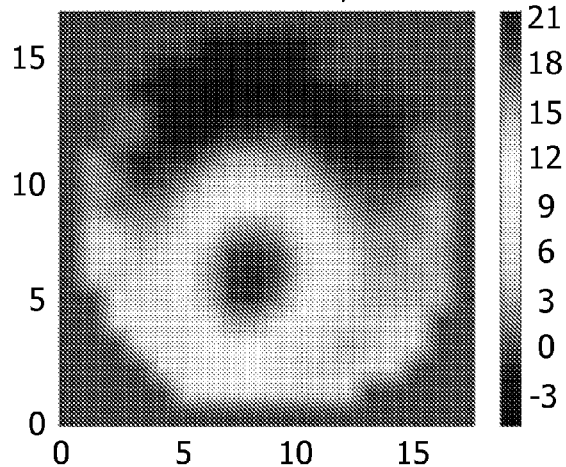
FIGS. 6(a)-6(c) are discrete images of an object acquired using the imaging system shown in FIG. 2.
Figure 6B:
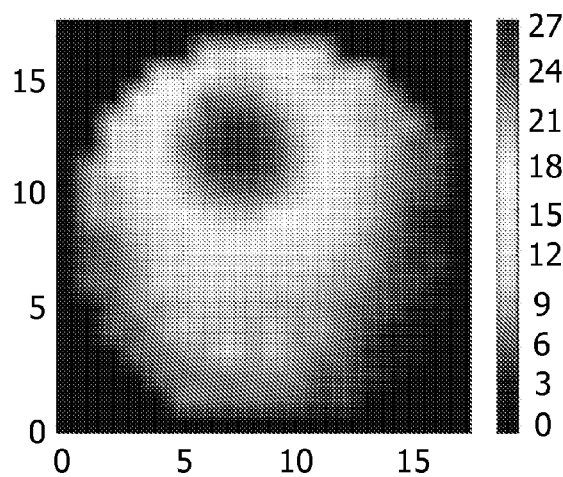
Figure 6C:
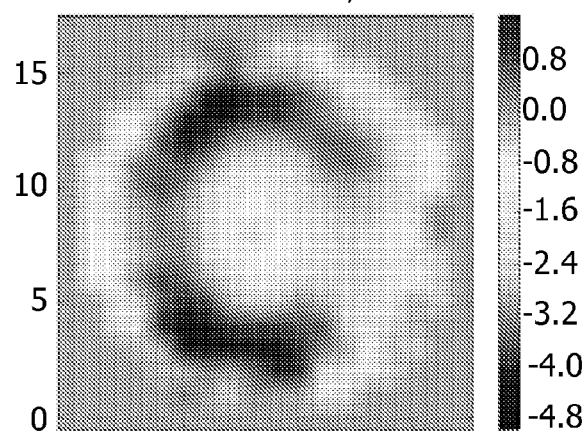
Figure 7A:
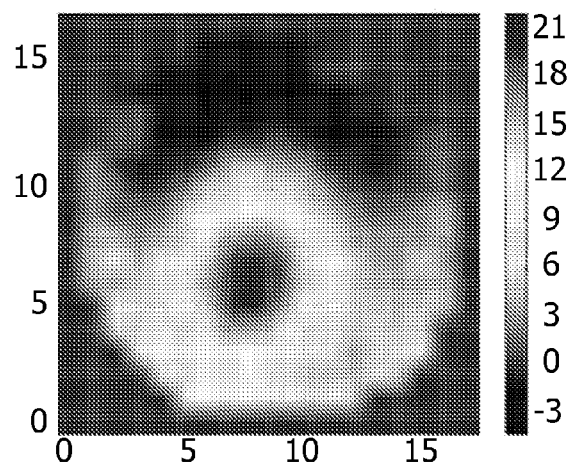
FIGS. 7(a)-7(c) are discrete images of an object acquired using the imaging system shown in FIG. 2.
Figure 7B:
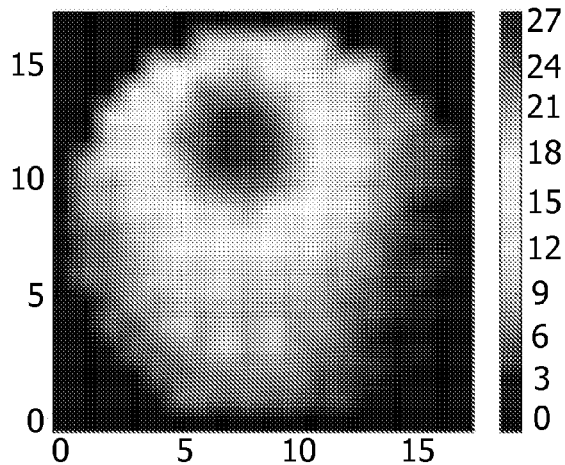
Figure 7C:
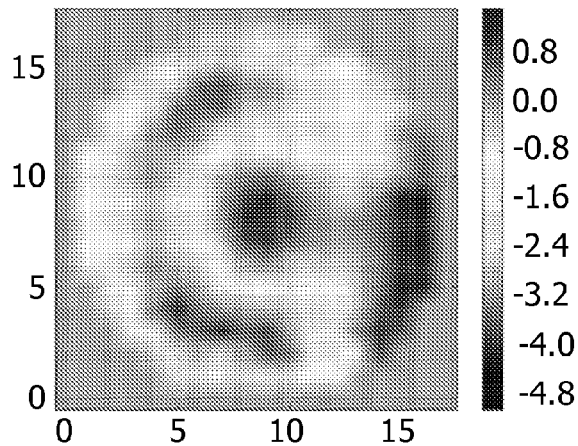

FIGS. 6(a)-6(c) are a discrete muscle image $I_M$, a discrete bone image $I_B$, and a discrete plastic image $I_P$, respectively, of an object including muscle component 250 and bone component 252, but no plastic component 254. FIGS. 7(a)-7(c) are a discrete muscle image $I_M$, a discrete bone image $I_B$, and discrete plastic image $I_P$, respectively, of an object including muscle component 250, bone component 252, and plastic component 254. As demonstrated by a comparison of FIG. 6(c) and FIG. 7(c), the presence of plastic component 254 is clearly identifiable in discrete plastic image $I_P$.

FIG. 8 is a flowchart of an exemplary method 800 that may be used with imaging system 200 (shown in FIG. 2). Processing device 204 instructs detector array 202 to acquire 802 tomographic image data of an object, for example, object 106, at a plurality of frequencies $v_1, v_2, \ldots v_j$. Using the acquired tomographic image data, processing device 204 generates 804 a composite image $M_v$ of the object at each of the plurality of frequencies $v_1, v_2, \ldots v_j$. That is, processing device 204 generates composite images $M_{v_1}, M_{v_2}, \ldots M_{v_j}$. Composite image $M_v$ is modeled 806 as a function of discrete component images. For example, using a linear least square approximate, $M_v$ may be modeled by $\alpha I_1 + \beta I_2 = M_v$, where α and β are constants, and $I_1$ and $I_2$ are discrete images of a first material and a second material, respectively.

For the first material, processing device 204 determines 808 a scaling factor $C_v^1$ at each of the plurality of frequencies $v_1, v_2, \ldots v_j$. For example, processing device 204 may determine scaling factors $C_{v_1}^1, C_{v_2}^1, \ldots C_{v_j}^1$. Further, for the second material, processing device 204 determines 810 a scaling factor $C_v^2$ at each of the plurality of frequencies $v_1, v_2, \ldots v_j$. For example, processing device 204 may determine scaling factors $C_{v_1}^2, C_{v_2}^2, \ldots C_{v_j}^2$. The scaling factors $C_v^1$ and $C_v^2$ may be determined using methods and systems similar to those described with respect to FIGS. 4(a)-4(c) and 5(a)-5(c). Alternatively, any methods and systems that enable imaging system 200 to function as described herein may be utilized to determine the scaling factors $C_v$.

Using the determined scaling factors $C_v$, processing device 204 decomposes 812 the composite images $M_v$ into the first discrete image $I_1$ and the second discrete image $I_2$. Discrete image $I_1$ contains any region of the object composed of the first material, and discrete image $I_1$ contains any region of the object composed of the second material. In one embodiment, discrete image $I_1$ is discrete muscle image $I_M$ containing any region of object 106 composed of muscle component 250, and discrete image $I_2$ is discrete plastic image $I_P$ containing any region of object 106 composed of plastic component 254. While in exemplary method 800, composite images $M_v$ are only decomposed into two discrete images, $I_1$ and $I_2$, composite images $M_v$ can be decomposed 812 into any number of discrete images, each discrete image representative of a different material. In method 800, processing device 204 also causes at least one of the discrete images, $I_1$ and $I_2$, to be displayed 814 on a display device, such as, for example, display device 206.

The above-described embodiments provide an imaging system that can be used to detect contraband located in or near an individual's body. For example, in a particular embodiment, the imaging system acquires tomographic image data of an object at a plurality of frequencies and generates a composite image of the object at each of the frequencies. The imaging system further determines a scaling factor for a first material and a second material at each of the frequencies and decomposes the composite images into a first discrete image and a second discrete image using the scaling factors. From the discrete images, it can be determined whether contraband is located in or near the object.

A technical effect of the systems and methods described herein includes at least one of: (a) acquiring tomographic image data of an object at a plurality of frequencies; (b) generating a composite image of the object at each of the plurality of frequencies using the acquired tomographic image data; (c) determining a scaling factor for a first material at each of the plurality of frequencies; (d) determining a scaling factor for a second material at each of the plurality of frequencies; and (e) decomposing the composite images into a first discrete image and a second discrete image using the determined scaling factors, wherein the first discrete image contains any region of the object composed of the first material, and the second discrete image contains any region of the object composed of the second material.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and nonremovable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of an imaging system for use with a security scanner and methods for using the same are described above in detail. The methods and systems are not limited to the specific embodiments described herein, but rather, components of systems and/or steps of the methods may be utilized independently and separately from other components and/or steps described herein. For example, the methods may also be used in combination with other imaging systems and methods, and are not limited to practice with only the EFT systems and methods as described herein. Rather, the exemplary embodiment can be implemented and utilized in connection with many other imaging applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for imaging an object, said method comprising:
   acquiring tomographic image data of the object at a plurality of frequencies;
   generating a composite image of the object at each of the plurality of frequencies using the acquired tomographic image data;
   determining a scaling factor for a first material at each of the plurality of frequencies;
   determining a scaling factor for a second material at each of the plurality of frequencies; and
   decomposing the composite images into a first discrete image and a second discrete image using the determined scaling factors, wherein the first discrete image contains any region of the object composed of the first material and the second discrete image contains any region of the object composed of the second material.

2. A method in accordance with claim 1, wherein acquiring tomographic image data comprises:
   generating an electric field at each of the plurality of frequencies such at least a portion of the generated electric field passes through the object; and
   detecting a phase shift of the electric field at each of the plurality of frequencies.

3. A method in accordance with claim 2, wherein generating an electric field comprises generating the electric field at a plurality of frequencies in a range of 1 megahertz to 20 megahertz.

4. A method in accordance with claim 1, further comprising displaying at least one of the first discrete image and the second discrete image on a display device.

5. A method in accordance with claim 1, wherein determining a scaling factor for a first material at each of the plurality of frequencies comprises determining scaling factors for a tissue material, and wherein determining a scaling factor for a second material at each of the plurality of frequencies comprises determining scaling factors for a non-tissue material.

6. A method in accordance with claim 1, wherein determining a scaling factor for a first material at each of the plurality of frequencies comprises determining scaling factors for one of a bone material and a muscle material.

7. A method in accordance with claim 1, wherein determining a scaling factor for a first material at each of the plurality of frequencies comprises acquiring image data of a calibration object, the calibration object composed of the first material.

8. A method in accordance with claim 1, further comprising:
   determining a scaling factor for a third material at each of the plurality of frequencies; and
   decomposing the composite images into a third discrete image using the determined scaling factors, wherein the third discrete image contains any region of the object composed of the third material, and wherein the third material is different from the first and second material.

9. A method in accordance with claim 1, wherein decomposing the composite images comprises decomposing the composite images using a linear least square approximation.

10. One or more non-transitory computer-readable storage media having computer-executable instructions embodied thereon for imaging an object, wherein when executed by at least one processor, the computer-executable instructions cause the at least one processor to:
    instruct a detector array to acquire tomographic image data of the object at a plurality of frequencies;
    generate a composite image of the object at each of the plurality of frequencies using the acquired tomographic image data;
    determine a scaling factor for a first material at each of the plurality of frequencies;
    determine a scaling factor for a second material at each of the plurality of frequencies; and
    decompose the composite images into a first discrete image and a second discrete image using the determined scaling factors, wherein the first discrete image contains any region of the object composed of the first material and the second discrete image contains any region of the object composed of the second material.

11. One or more non-transitory computer-readable storage media in accordance with claim 10 further comprising computer-executable instructions that cause the at least one processor to:
    determine a scaling factor for a third material at each of the plurality of frequencies; and
    decompose the composite images into a third discrete image using the determined scaling factors, wherein the third discrete image contains any region of the object composed of the third material, and wherein the third material is different from the first and second material.

12. One or more non-transitory computer-readable storage media in accordance with claim 10 further comprising computer-executable instructions that cause the at least one processor to display at least one of the first discrete image and the second discrete image on a display device coupled to the at least one processor.

13. One or more non-transitory computer-readable storage media in accordance with claim 10, wherein the first material is a tissue material and the second material is a non-tissue material.

14. An imaging system for imaging an object, said system comprising:
- a detector array configured to acquire tomographic image data of the object at a plurality of frequencies; and
- a processing device coupled to said detector array and configured to:
  - instruct said detector array to acquire tomographic image data of the object at a plurality of frequencies;
  - generate a composite image of the object at each of the plurality of frequencies using the acquired tomographic image data;
  - determine a scaling factor for a first material at each of the plurality of frequencies;
  - determine a scaling factor for a second material at each of the plurality of frequencies; and
  - decompose the composite images into a first discrete image and a second discrete image using the determined scaling factors, wherein the first discrete image contains any region of the object composed of the first material and the second discrete image contains any region of the object composed of the second material.

15. An imaging system in accordance with claim 14, wherein said detector array comprises a plurality of electrodes, each of said plurality of electrodes configured to generate an electric field at each of the plurality of frequencies and detect a phase shift in the generated electric field.

16. An imaging system in accordance with claim 15, wherein the plurality of frequencies are in a range of 1 megahertz to 20 megahertz.

17. An imaging system in accordance with claim 14, wherein the first material is a tissue material.

18. An imaging system in accordance with claim 14, wherein the second material is a non-tissue material.

19. An imaging system in accordance with claim 14, wherein said processing device is further configured to:
- determine a scaling factor for a third material at each of the plurality of frequencies; and
- decompose the composite images into a third discrete image using the determined scaling factors, wherein the third discrete image contains any region of the object composed of the third material, and wherein the third material is different from the first and second material.

20. An imaging system in accordance with claim 14 further comprising a display device configured to display at least one of the first discrete image and the second discrete image.

* * * * *